G. A. LUTZ.
ELECTRIC BATTERY.
APPLICATION FILED JULY 29, 1909.
1,045,862.
Patented Dec. 3, 1912.
2 SHEETS—SHEET 1.
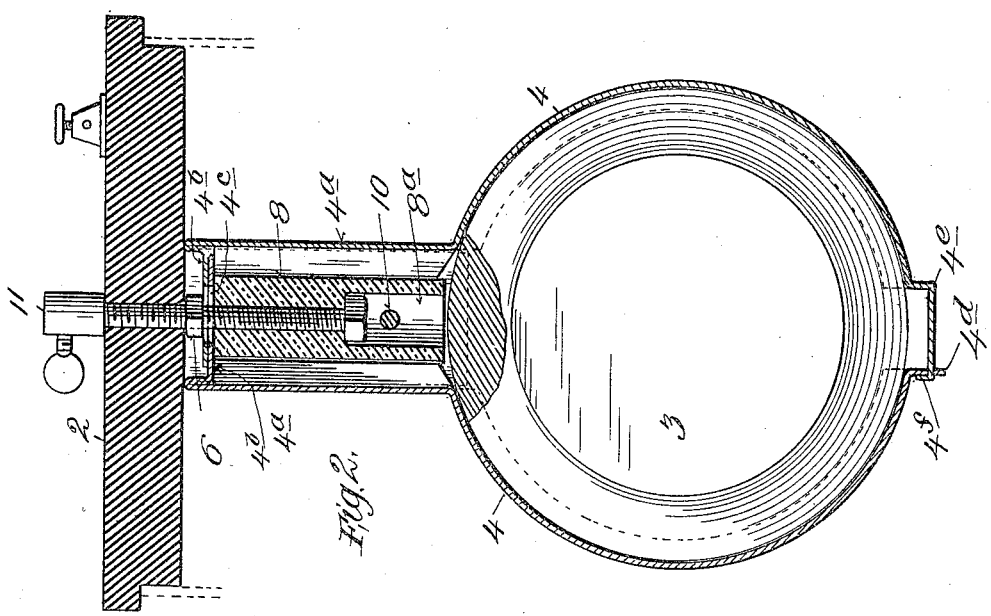
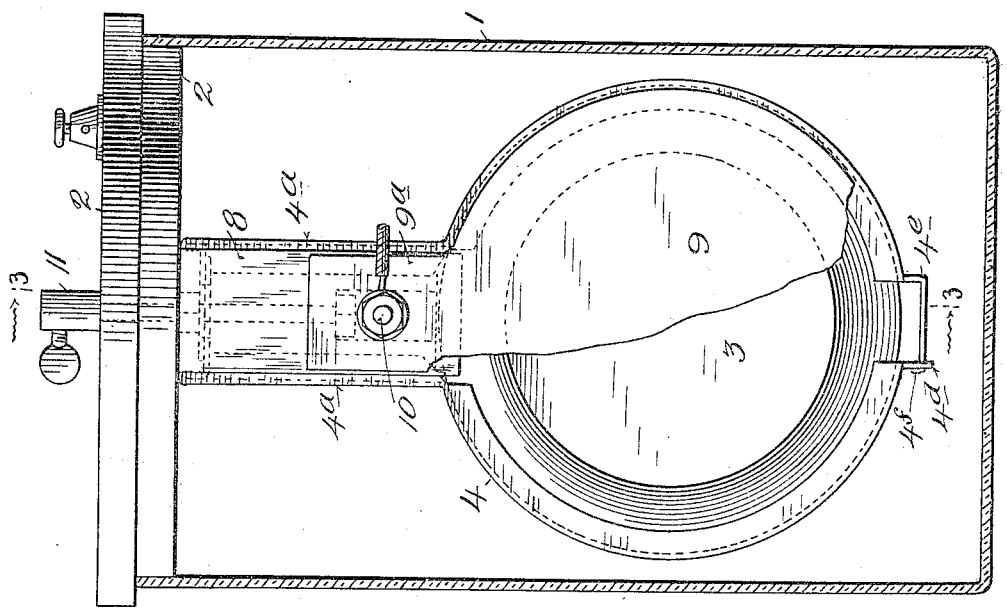
Witnesses:
Inventor
George A. Lutz.
By his Attorney
P. F. Bourne

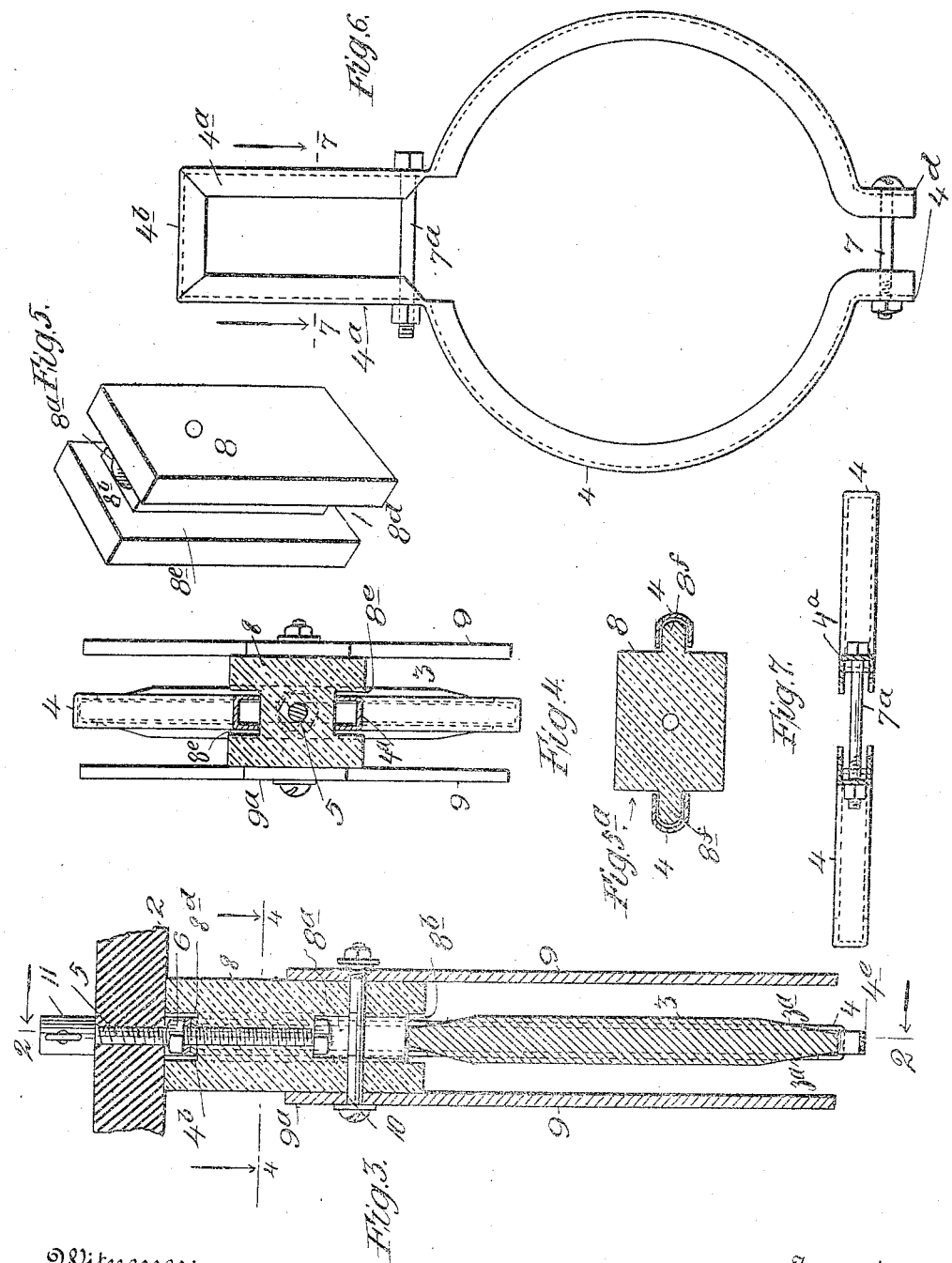

UNITED STATES PATENT OFFICE.

GEORGE A. LUTZ, OF PLAINFIELD, NEW JERSEY.

ELECTRIC BATTERY.

1,045,862.  Specification of Letters Patent.  Patented Dec. 3, 1912.

Application filed July 29, 1909. Serial No. 510,221.

*To all whom it may concern:*

Be it known that I, GEORGE A. LUTZ, a citizen of the United States, and resident of Plainfield, in the county of Union and State of New Jersey, have invented certain new and useful Improvements in Electric Batteries, of which the following is a specification.

My invention has reference to improvements in the class of electric batteries employing a depolarizer comprising a plate of compressed metal oxid, such as cupric oxid, and a positive electrode, such as zinc. In the manufacture of such depolarizer plates difficulties arise in producing the same in a substantially rectangular form owing to the fact that when such plates are removed from the compressing molds or dies there is danger of the edges of the plates becoming more or less broken or chipped, involving a considerable loss of material and labor, and there is a further difficulty experienced in that such compressed plates are not uniform in size after being baked, due to the shrinkage that takes place. Owing to such variations in the size of the baked plates, although they be formed in the same mold, difficulty is found in properly adjusting the supporting frames to the plates and making good contact therewith at various parts of the plates.

The object of my invention is to overcome the difficulties and objections set forth as well as others incidental to the manufacture and use of such battery plates, whereby the cost will be reduced, the handling of the parts will be facilitated, and the efficiency of the battery will be maintained or increased.

In carrying out my invention I provide a depolarizer plate in annular or disk-like form, and apply a substantially circular or annular frame or holder about the annular edges of the plate, with means for properly supporting such frame and the positive electrode in proper position with respect to said plate and insulated therefrom.

My invention also comprises novel details of construction and arrangements of parts that will be more fully hereinafter set forth and then pointed out in the claims.

Reference is to be had to the accompanying drawings forming part hereof, wherein, Figure 1 is a sectional view, partly broken, of a primary electric battery embodying my invention; Fig. 2 is a sectional view substantially on the line 2, 2, in Fig. 3; Fig. 3 is a section substantially on the line 3, 3, in Fig. 1; Fig. 4 is a section on the line 4, 4, in Fig. 3; Fig. 5 is an inverted perspective view of the supporting insulating block for the electrodes; Fig. 5$^a$ is a sectional detail of a modification; Fig. 6 is a detail view of a modified form of the frame or holder for the depolarizer plate, and Fig. 7 is a section on the line 7, 7, in Fig. 6.

Similar numerals of reference indicate corresponding parts in the several views.

1 indicates a jar and 2 its insulating cover, which may be of any suitable construction. The depolarizer plate or negative electrode 3 is shown in annular or disk-like form of suitable thickness. Plate 3 is shown provided with annular beveled surfaces 3$^a$ leading to the periphery of the plate. A frame or hanger 4, shown made in channel form, is mainly in circular or annular form approximating the periphery of circular plate or disk 3 and fitted around the edge thereof, whereby good contact between said plate and frame may be made owing to the ability of said frame to be drawn snugly against plate 3 due to the annular form of said frame. Frame 4 is provided with an extension having side members 4$^a$ spaced apart, by which said frame may be supported or hung. Frame 4 and its extension 4$^a$ may be made of a single piece of material as in Figs. 6 and 7, or said frame may be made of a plurality of parts connected together, whereby the frame is readily attached to annular depolarizer plates 3 that may vary somewhat in diameter.

In Figs. 1 to 4 I have shown the frame as made in two separate parts each having an extension member 4$^a$, and means for connecting the opposite ends of the frame parts together. In this example each extension member 4$^a$ is provided with a laterally disposed finger or web 4$^b$ which is adapted to lie one upon the other (Figs. 2 and 3), and to be firmly held in position. I have shown said fingers provided with registering slots 4$^c$ adapted to receive a rod 5 which is shown provided with threads receiving a nut 6 for clamping the fingers 4$^b$ together, whereby said fingers are adjustable and may be held in positions of adjustment, and electrical contact between rod 5 and frame 4 is effected. While with the construction shown in Figs. 1 to 4 the lower part of frame 4 may be in a single piece, I have shown frame 4 divided in two parts detachably connected together. For this purpose one member of said frame may have an ear 4ᵈ having an opening receiving projection 4ᵉ carried by the other member of the frame, the end 4ᶠ of projection 4ᵉ being bent back against ear 4ᵈ to firmly clamp the frame upon plate 3. If preferred, the members of frame 4 may each be provided with ears 4ᵈ connected together by a screw or bolt 7 for the same purpose, and a screw or bolt 7ᵃ may pass through extensions 4ᵃ to aid in holding the frame snugly against plate 3, see Fig. 6. The annular electrodes 3 may be made with little danger of breakage as they have no corners, and the arrangement of frames described is such that they may be clamped around the electrodes and drawn tightly to fit properly notwithstanding variation in diameter or contour of the electrodes that are made in the same or corresponding molds.

At 8 is an insulating block which is shown supported from cover 2 by rod 5, and said block supports frame 4, plate 3, and the positive electrodes or zincs 9. Said block is shown provided with an upwardly disposed aperture through which rod 5 passes, and with a recess 8ᵃ in which the head of rod 5 is located. Block 8 is shown provided with a gain or recess 8ᵇ in its under surface in which the upper edge of plate 3 is located. Block 8 is also shown provided with a recess or gain 8ᵈ in its upper end within which the upper transverse portion 4ᵇ of frame 4 fits, and the nut 6 on rod 5 serves to clamp the transverse portion of frame 4 firmly in recess 8ᵈ against block 8. Block 8 is also shown provided with vertically disposed recesses or gains 8ᵉ in which the side members of extension 4ᵃ of frame 4 fit or block 8 may have vertical ribs 8ᶠ on opposite sides receiving the channel extensions 4ᵃ, see Fig. 5ᵃ. The recesses 8ᵈ, 8ᵉ or ribs 8ᶠ of block 8 serve to maintain frame 4 in proper position upon the block and prevent undue lateral movement of depolarizer plate 3. The positive electrodes or zincs 9 are shown in disk form corresponding to the periphery of depolarizer plate or negative electrode 3, and said positive electrodes are shown provided with extensions 9ᵃ located at the sides of block 8 and secured thereto by screw or bolt 10 passing through extensions 9ᵃ and block 8 but out of contact with frame 4 and rod 5. Zincs 9 are thus securely held in proper position with relation to plate 3 and insulated therefrom. Rod 5 is supported from cover 2 as by a block or head 11 detachably fitted upon rod 5, or block 11 can be made integral with block 5 and the latter be provided with a nut at its lower end.

As frame 4, the positive electrode, and the negative electrode or electrodes are supported by cover 2 by means of the insulating block 8 hanging from said cover, the parts may be readily removed and replaced, are all maintained in proper relative positions, and when the parts are separated frame 4 may be readily opened to permit the removal and replacement of plates 3 in a convenient manner and without danger of injury.

In this application I do not broadly claim the arrangement of the insulating block, the rod for the same and the electrodes carried by said block, as that is the subject of my application for patent on primary electric batteries, Serial No. 499,154, filed May 29, 1909.

My invention is not limited to the particular details of construction set forth herein, as changes may be made, within the scope of the appended claims, without departing from the spirit thereof.

Having now described my invention what I claim is:—

1. A battery element comprising a circular compressed metal oxid plate and a frame of generally circular form conforming to the shape of said plate and secured around the periphery of the same.

2. A battery element comprising a circular compressed metal oxid plate, and a frame of general circular form conforming to the shape of said plate and secured around the periphery of the same, said frame having a centrally disposed extension for supporting the same.

3. A battery element comprising a circular plate of compressed metal oxid, a circular grooved frame fitted upon and receiving the periphery of said plate, means for detachably clamping said frame upon said plate, an insulator, and means for suspending said frame from said insulator.

4. A battery element comprising a circular plate, a circular frame fitted around the periphery of said plate, said frame having an extension projecting from the frame at a point within the space included between parallel tangents at opposite edges of the frame.

5. A battery element comprising a circular plate, a circular frame provided with an extension on one side, said frame being divided on the opposite side, one member of the frame having an ear, and the other member having means for detachable connection with said ear.

6. A battery element comprising a circular plate, a circular frame provided with an extension on one side, said frame being divided on the opposite side, one member of the frame having an ear and the other member having a projection passing through an opening in said ear and having its end bent into engagement with the ear.

7. A battery element comprising a plate, a frame fitted to the periphery of said plate and provided with an extension, said extension comprising two members spaced apart, each member having a laterally disposed finger, and means to hold said fingers in positions of adjustment.

8. A battery element comprising a plate, a frame fitted to the periphery of said plate and provided with an extension, said extension comprising two members spaced apart, each member having a laterally disposed finger, said fingers having slots, a rod passing through said slots, and means for clamping the said rod to said fingers.

9. An electric battery comprising a plate, a frame fitted at the edges of said plate and provided with an extension having transversely disposed members adjustable relative to each other, and an insulating block fitted between the members of said extension, said block having means at its edges receiving the members of said extension, and means to connect said members together.

10. An electric battery comprising a plate, a frame fitted at the edges of said plate and provided with an extension having members spaced apart and provided with transversely disposed portions adjustable relatively to each other, and an insulating block having gains in its edges receiving the members of said extension, and means to connect said extensions together.

11. An electric battery comprising a plate, a frame fitted at the edges of said plate and provided with an extension having members spaced apart, each member being provided with a transversely disposed portion, an insulating block having gains in its edges receiving the members of said extension, and a rod passing through said block, a member of said extension being in circuit with said rod.

12. A battery comprising a plate, a frame secured upon said plate and provided with an extension having laterally disposed fingers, an insulating block received in said extension, a rod passing through said block and fingers, and a nut on said rod bearing upon and clamping said fingers to said block forming circuit between said rod and member.

13. A battery comprising a plate, a frame fitted to said plate and provided with an extension having members spaced apart, an insulating block fitted between said members, said extension having a transversely disposed member resting upon said block, a rod passing through said block and transverse member, and a nut on the rod clamping said transverse member to said block, said block having a gain in its under end receiving said plate.

14. A battery comprising a plate, a frame fitted upon the plate and provided with an extension having side members spaced apart, each being provided with a transversely disposed member, and an insulating block having means at its sides receiving said side members and a gain in its upper end receiving the transverse member, and also having a gain in its under side receiving said plate.

15. A battery comprising a plate, a frame fitted upon the plate and provided with an extension having side members spaced apart, each being provided with a transversely disposed member, and an insulating block having means at its sides receiving said side members and a gain in its upper end receiving the transverse member, and also having a gain in its under side receiving said plate, a rod passing through said block and said transverse member and in circuit with said member.

16. A battery comprising a plate, a frame fitted upon the plate and provided with an extension having side members spaced apart, each being provided with a transversely disposed member, an insulating block having means at its sides receiving said side members and a gain in its upper end receiving the transverse member and also having a gain in its under side receiving said plate, a rod passing through said block and said transverse member, and a nut upon said rod clamping the transverse member to said block.

17. A primary battery comprising a circular negative plate of compressed metal oxid, a circular frame fitted to the periphery of said plate, a circularly disposed positive electrode conforming in outline with said plate, and insulating means adjacent said plate for supporting said positive electrode adjacent to and insulated from said plate.

18. A primary battery comprising a circular negative plate of compressed metal oxid, a circular frame fitted to the periphery of said plate, a circular positive electrode conforming in outline to said plate, an insulating block connected with said frame and extending outwardly beyond the plane thereof, and means for securing said positive electrode to said block.

19. A battery comprising a circular plate of compressed cupric oxid, a circular frame fitted at the periphery of said plate and provided with a centrally disposed extension, an insulating block fitted within said extension, a circular positive electrode at the side of said plate and provided with an extension, and means for securing said extension to said block insulated from said plate and frame.

20. In a battery element support of the class described, the combination of a flat circular shaped compressed negative plate, a correspondingly circular shaped frame for engaging the circular edge portions of the plate, and means for suspending the same from a jar cover.

21. In an electrode support for batteries, the combination of a flat circular shaped compressed negative electrode, a circular shaped channel frame adapted to encircle the edge portions of said electrode, means for securing the ends of the channel frame together to inclose said electrode, and connections for suspending the device from a battery jar cover.

22. In an electrode support for batteries, the combination of a flat circular shaped compressed negative plate, a two part circular shaped channel frame connected together at the bottom, and inclosing the edges of the plate, means for connecting the upper ends of the said channel frame, an insulating block intermediate of said upper ends of the frame, positive plates attached to the block, and means for suspending the parts from a battery jar cover.

23. An electrode support for batteries comprising a flat circular shaped compressed negative plate electrode, two semi-circular shaped frame members to engage the opposite circular edges of the plate, and means for suspending the same from the jar cover.

24. An electrode support for batteries, comprising two circular shaped frame members hinged together at their lower ends and having their upper adjoining ends disposed outward, an insulating block intermediate of said upper ends, means for connecting the said ends and block together, positive plates attached to the block, and means for suspending the whole from the cover of a battery jar.

Signed at New York city, in the county of New York and State of New York this 27th day of July, A. D. 1909.

GEORGE A. LUTZ.

Witnesses:
T. F. BOURNE,
RALPH H. RAPHAEL.

---

Copies of this patent may be obtained for five cents each, by addressing the "Commissioner of Patents, Washington, D. C."